US011048792B2

(12) United States Patent
Boodaei (10) Patent No.: US 11,048,792 B2
(45) Date of Patent: Jun. 29, 2021

(54) RISK BASED BRUTE-FORCE ATTACK PREVENTION

(71) Applicant: Transmit Security Ltd., Tel-Aviv (IL)

(72) Inventor: Michael Boodaei, Givatayim (IL)

(73) Assignee: Transmit Security Ltd., Tel-Aviv (IL)

( * ) Notice: Subject to any disclaimer, the term of this patent is extended or adjusted under 35 U.S.C. 154(b) by 335 days.

(21) Appl. No.: 16/172,803

(22) Filed: Oct. 28, 2018

(65) Prior Publication Data

US 2020/0134165 A1    Apr. 30, 2020

(51) Int. Cl.
| | |
|---|---|
| *G06F 21/45* | (2013.01) |
| *H04L 29/06* | (2006.01) |
| *G06F 21/31* | (2013.01) |
| *G06F 21/62* | (2013.01) |
| *G06F 21/60* | (2013.01) |

(52) U.S. Cl.
CPC ............ *G06F 21/45* (2013.01); *G06F 21/316* (2013.01); *G06F 21/604* (2013.01); *G06F 21/62* (2013.01); *H04L 63/083* (2013.01); *H04L 63/20* (2013.01); *H04L 63/308* (2013.01); *G06F 2221/2101* (2013.01); *G06F 2221/2137* (2013.01)

(58) Field of Classification Search
CPC ...... G06F 21/316; G06F 21/45; G06F 21/602; G06F 21/62; G06F 2221/2101; G06F 2221/2137; H04L 63/08; H04L 63/083; H04L 63/10; H04L 63/20; H04L 63/308
See application file for complete search history.

(56) References Cited

U.S. PATENT DOCUMENTS

| | | | | |
|---|---|---|---|---|
| 9,722,996 | B1 * | 8/2017 | Kolman | ................ H04L 63/083 |
| 2009/0006856 | A1 * | 1/2009 | Abraham | ................ G06F 21/55 |
| | | | | 713/183 |
| 2013/0254875 | A1 * | 9/2013 | Sama | ...................... G06F 21/31 |
| | | | | 726/19 |
| 2018/0124033 | A1 * | 5/2018 | Greenspan | .......... H04L 63/0861 |
| 2019/0384897 | A1 * | 12/2019 | Urmanov | ............ H04L 63/0815 |

* cited by examiner

*Primary Examiner* — Jung W Kim
*Assistant Examiner* — Adrian Stoica (57) ABSTRACT

A computerized method of reducing a probability for falsely classifying a legitimate authentication process conducted by a legitimate user as a password guessing attack, comprising estimating a password guessing attack risk for an authentication process conducted by a user for accessing a secure service by performing the following for each of a plurality of failed access attempts in which the user provides incorrect authentication credentials: (1) calculate a risk score for a respective failed access attempt based on analysis of the incorrect authentication credentials provided during the respective failed access attempt and (2) update an authentication session score of the authentication process according to the calculated risk score and initiate one or more actions in case the updated authentication session value exceeds one or more threshold values extracted from a security policy predefined for the secure service.

12 Claims, 3 Drawing Sheets

RISK BASED BRUTE-FORCE ATTACK PREVENTION

BACKGROUND

The present invention, in some embodiments thereof, relates to classifying failed access attempts as a password guessing attack, and, more specifically, but not exclusively, to classifying failed access attempts as a password guessing attack according to a risk based assessment of incorrect credentials provided in the failed access attempts.

Access to online resources is often subject to user authentication in which the user is required to provide evidence to prove his identity. Such authentication may be a major concern when accessing secure services, secure systems, secure platforms and/or the like such as, for example, an online finance service (e.g. a banking service, a credit/debit card service, etc.), a remote access system, a private information resource and/or the like. The user authentication may be carried out by a plurality of methods, techniques and/or implementations Such secure services may often be targeted by malicious parties applying a variety of exploitation means for acquiring the authentication credentials of legitimate user(s). One of the most common such exploitation means include password guessing attacks, brute-force attacks, dictionary attacks and/or the like which may be initiated to apply one or more methods, techniques and/or algorithms for guessing the authentication credentials of the legitimate user(s).

SUMMARY

According to a first aspect of the present invention there is provided a computer implemented method of reducing a probability for falsely classifying a legitimate authentication process conducted by a legitimate user as a password guessing attack, comprising using one or more processors for estimating a password guessing attack risk for an authentication process conducted by a user for accessing a secure service by performing the following for each of a plurality of failed access attempts in which the user provides incorrect authentication credentials:

Calculate a risk score for a respective failed access attempt based on analysis of the incorrect authentication credentials provided during the respective failed access attempt.

Update an authentication session score of the authentication process according to the calculated risk score.

Initiate one or more actions in case the updated authentication session value exceeds one or more threshold values extracted from a security policy predefined for the secure service.

Analyzing the incorrect authentication credentials may allow detection of pattern(s) and/or characteristic(s) in the incorrect authentication credentials which are typical to legitimate users providing the incorrect authentication credentials by mistake and are very non-characteristic for the password guessing attacks. Adjusting the overall authentication session score according to the risk score calculated for each failed access attempt may therefore significantly reduce the probability of false positively classifying the legitimate users as password guessing attacks while maintaining high capability for detecting real password guessing attacks.

According to a second aspect of the present invention there is provided a system for reducing a probability for falsely classifying a legitimate authentication process conducted by a legitimate user as a password guessing attack, comprising a program store storing a code and one or more processors coupled to the program store for executing the stored code. The code comprising code instructions to estimate a password guessing attack risk for an authentication process conducted by a user for accessing a secure service by performing the following for each of a plurality of failed access attempts in which the user provides incorrect authentication credentials:

Calculate a risk score for a respective failed access attempt based on analysis of the incorrect authentication credentials provided during the respective failed access attempt.

Update an authentication session score of the authentication process according to the calculated risk score.

Initiate one or more actions in case the updated authentication session value exceeds one or more threshold values extracted from a security policy predefined for the secure service.

In a further implementation form of the first and/or second aspects, the authentication credentials comprising one or more members of a group consisting of: a code, a password and/or a key. Supporting a wide range of authentication credentials types may allow easy and simple adoption of the risk estimation for a plurality of secure services, systems, devices and/or platforms which may employ different types of authentication credentials.

In a further implementation form of the first and/or second aspects, the password guessing attack comprising one or more members of a group consisting of: a dictionary attack and/or a brute-force attack. The risk assessment and estimation to avoid classification of legitimate users as malicious password guessing attacks may be applied for protection against practically any type of password guessing attack.

In a further implementation form of the first and/or second aspects, the incorrect authentication credentials provided during each failed access attempt are stored for the duration of the authentication process. Storing the incorrect authentication credentials of current as well as previous failed access attempts may be essential for detecting the pattern(s) and/or characteristic(s) in the incorrect authentication credentials provided in future failed access attempt(s).

In a further implementation form of the first and/or second aspects, by default the risk score is set to a predefined maximum value. In order to maintain high detection of real password guessing attacks and prevent compromising the secure service, each failed access attempt may be first considered part of a password guessing attack.

In a further implementation form of the first and/or second aspects, the risk score is set to zero in case the incorrect authentication credentials provided during the respective failed access attempt are identical to the incorrect authentication credentials provided in one or more previous failed access attempts during the current authentication process. Identical incorrect authentication credentials provided during multiple failed access attempts is highly indicative of legitimate users mistakenly providing the incorrect authentication and in contrast is very non-typical to access attempts initiated by the password guessing attacks. The risk may be therefore significantly reduced and set to zero for such scenarios.

In a further implementation form of the first and/or second aspects, the risk score is set to a predefined first value lower than the predefined maximum value in case the incorrect authentication credentials provided during the respective failed access attempt are identical to the incorrect authentication credentials provided in one or more previous failed access attempts during the current authentication process with the exception that the current incorrect authentication credentials are in a different character capitalization compared to the previous incorrect authentication credentials. Capitalization differences in otherwise similar incorrect authentication credentials provided during repetitive failed access attempts may be highly indicative of legitimate users mistakenly providing the incorrect authentication and very non-typical to access attempts initiated by the password guessing attacks. The risk score may be therefore significantly reduced for such scenarios.

In a further implementation form of the first and/or second aspects, the risk score is set to a predefined second value lower than the predefined maximum value in case a Levenshtein distance calculated between the incorrect authentication credentials provided during the respective failed access attempt are and the incorrect authentication credentials provided in a previous failed access attempt during the current authentication process is within a predefined distance threshold. Short Levenshtein distance between incorrect authentication credentials provided during multiple failed access attempts may be highly indicative of a misspell error made by a legitimate user and very non-typical to the password guessing attacks attempting to cover a wide range of passwords. The risk score may be therefore significantly reduced for such scenarios.

In a further implementation form of the first and/or second aspects, in case a plurality of previous failed access attempts were conducted prior to the respective failed access attempt, the risk score is set to the predefined second value in case a maximum Levenshtein distance is within the predefined distance threshold, the maximum Levenshtein distance is a largest value of the Levenshtein distance calculated between the incorrect authentication credentials provided during the respective failed access attempt and each of the incorrect authentication credentials provided during the plurality of previous failed access attempts. In case of multiple failed access attempts the maximal Levenshtein distance is calculated between the currently provided incorrect authentication credentials and all previously provided incorrect authentication credentials to apply worst case scenario and avoid reducing the risk score for closely related incorrect authentication credentials provided during the same authentication process (session).

In a further implementation form of the first and/or second aspects, the risk score is set to a predefined third value lower than the predefined maximum value in case the incorrect authentication credentials provided during the respective failed access attempt are identical to previously valid historical authentication credentials used by the user in the past for accessing the secure service. Incorrect authentication credentials which are identical to authentication credentials which were correct (valid) in the past may be highly indicative of legitimate users mistakenly providing the previously valid authentication credentials and very non-typical to access attempts initiated by the password guessing attacks which are not familiar with historically valid authentication credentials. The risk may be therefore significantly reduced for such scenarios.

In a further implementation form of the first and/or second aspects, the one or more actions are defined by the security policy predefined for the secure service. Each of the one or more actions is a member of a group consisting of: instructing a permanent lock of access to the secure service for the user, instructing lock of access to the secure service for the user for a predefined time period and/or generating one or more notification messages to the user. Selecting one or more actions in case of a cumulative risk score exceeding a predefined threshold may allow for high flexibility in the for high flexibility in deploying the counter measures taken in case of suspicion of the password guessing attacks.

In an optional implementation form of the first and/or second aspects, the one or more of the threshold values are adjusted according to authentication processes analytics generated based on analysis of a plurality of authentication processes conducted by a plurality of users attempting to access the secure service. Generating the statistical analytics for the authentication processes may allow dynamically adjusting the security policy associated with the secure service to fine tune one or more of the threshold values according to the typical patterns and/or characteristic(s) identified by analyzing a very large number of authentication processes conducted by a plurality of users.

In an optional implementation form of the first and/or second aspects, the one or more of the predefined values are adjusted according to the authentication processes analytics. The predefined values comprise the predefined maximum value, the first predefined value, the second predefined value and the third predefined value which are used for calculating the risk value for the incorrect authentication credentials provided during one or more failed access attempts. Similarly, using the statistical analytics generated for the authentication processes may allow dynamically fine tune of the risk score values used for estimating the authentication process as conducted by legitimate user or password guessing attacks according to the typical patterns and/or characteristic(s) identified for the large number of authentication processes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to classifying failed access attempts as a brute-force attack, and, more specifically, but not exclusively, to classifying failed access attempts as a brute-force attack according to a risk based assessment of incorrect credentials provided in the failed access attempts.

Secure services, secure devices, secure terminals, secure systems, secure platforms and/or the like collectively designated secure service herein after may require user authentication prior to granting access for the user to the secure service. The user authentication may be done by verifying authentication credentials provided by the user during an authentication process (session), for example, a password, a code, a key and/or the like. Such secure services may be targeted by one or more malicious parties applying password guessing attacks, for example, a brute-force attack, a dictionary attack and/or the like in attempt to guess the authentication credentials of legitimate user(s). The authentication process for the secure service may therefore allow for several failed access attempts (e.g. 3, 5, 10, etc.) in which the user may provide incorrect authentication credentials before denying access and/or locking the secure service for the user.

According to some embodiments of the present invention, there are provided methods and systems for reducing a probability of falsely classifying an authentication process (session) conducted by a legitimate user attempting to access a secure service as a password guessing attack based on a risk score calculated for the authentication process to reflect the risk that the authentication process is conducted as part of a password guessing attack.

The risk score may be calculated based on analysis of incorrect authentication credentials provided during multiple failed access attempts of the authentication process.

The analysis is applied to identify one or more patterns and/or characteristics in the incorrect authentication credentials, in particular patterns and/or characteristics typical to incorrect authentication credentials mistakenly provided by a legitimate user. The risk score calculated for each of the failed access attempts based on the analysis may be aggregated for the entire (current) authentication process and used to reduce the probability of false positively classifying the authentication process conducted by a legitimate user as a password guessing attack.

Typically, for security reasons, authentication of users attempting to access the secure service is based on verifying the authentication credentials provided by each user during the authentication process match a hashed version of the correct (actual) authentication credentials of the respective user. The hashed authentication credentials may be generated using one or more hashing methods, technique and/or algorithm, in particular, one-way hashing method(s) such that the correct authentication credentials cannot be recovered from the hashed version. Authentication of the users is therefore done by hashing the authentication credentials provided by the user during the authentication process using the same hashing method(s) used for creating the hashed version of the correct authentication credentials and comparing the two hash values. In case of a match, the authentication is successful and the user may be granted access to the secure service. However, in case of failure the authentication fails and the user may be denied access to the secure service.

Since the actual correct authentication credentials of the user(s) are not available, the risk score is calculated for the authentication process based on comparison between authentication credentials provided during multiple failed access attempts rather than compared to the correct authentication credentials. In particular, the risk score is calculated based on detection of the pattern(s) and/or the characteristic(s) typical to incorrect authentication credentials provided by legitimate users, for example, similar incorrect authentication credentials, similar incorrect authentication credentials except for capitalization differences, small textual difference, short textual distance and/or the like. Moreover, the incorrect authentication credentials provided during one or more of the failed access attempts may be analyzed to identify that the incorrect authentication credentials are identical to historically valid (correct) authentication credentials provided by the user during one or more previous authentication processes (sessions). Such pattern(s) and/or characteristic(s) are not likely to be found in authentication credentials provided during a password guessing attacks since in attempt to cover a wide range of authentication credentials, the authentication credentials provided during a password guessing attacks are typically different from each other.

The risk score may be calculated for each failed access attempt based on the pattern(s) and/or the characteristic(s) detected in the authentication credentials provided during the respective failed access attempt compared to the authentication credentials provided during one or more previous failed access attempts. The primary goal of applying the authentication process is to prevent compromise of the secure service. As an initial step, the worst case scenario is therefore assumed, i.e. the authentication process is conducted as part of a password guessing attack. Therefore initially, a maximum risk score may be assigned to each failed access attempt. The maximum risk score value may be extracted from a security policy predefined for the secure service. However, the risk score may be reduced for each failed access attempt in which one or more of the patterns and/or characteristics typical to authentication credentials provided by legitimate users are detected. For example, the risk score may be set to a minimum value, e.g. zero in case the incorrect authentication credentials are identical to those provided in previous failed access attempt(s). In another example, the risk score may be reduced for failed access attempt(s) in which the incorrect authentication credentials are within a predefined textual distance (e.g. Levenshtein distance, etc.) from incorrect authentication credentials provided in previous failed access attempt(s). The risk score may be adjusted, reduced and/or set for theses failed access attempt(s) according to settings and values predefined by the security policy of the secure service.

A global authentication session score calculated for the authentication process (session) may be updated according to the risk score calculated for each of a plurality of failed access attempts. The authentication session score may be updated by aggregating, for example, accumulating, summing, multiplying and/or the like the risk scores calculated for the plurality of failed access attempts.

Following each failed access attempt, the updated authentication session score may be compared to value(s) of one or more predefined thresholds, for example, an indication threshold, a lockout threshold and/or the like. The predefined thresholds' values may be extracted from the security policy of the secure service. In case the authentication session score exceeds one of the predefined threshold value one or more actions may be initiated, for example, instruct lockout of the secure service for the user, generating one or more indication messages to the user and/or to one or more systems and/or personnel involved in operation of the secure service and/or the like. For example, one or more messages presented to the user may indicate the type of the pattern and or related aspects, for example, indicate a CAP LOCK settings and/or the like.

Optionally, statistical analytics are generated based on analysis of data collected and/or generated during analysis of a plurality of authentication processes conducted by a plurality of users, in particular based on analysis of the pattern(s) and characteristic(s) detected during the plurality of authentication processes as typical to the legitimate users. Moreover, the security policy associated with the secure service, specifically one or more of the risk score assigned values and/or thresholds values may be updated and/or adjusted according to the generated analytics.

Reducing the probability of falsely classifying a valid authentication process conducted by a legitimate user as a password guessing malicious attack may present significant advantages over currently existing methods and systems for user authentication.

The existing user authentication methods may typically classify the authentication credentials provided by the user as correct or incorrect. These existing user authentication methods may therefore indiscriminately lockout legitimate user(s) that mistakenly provides incorrect authentication credentials in a predefined number of access attempts. This is because an authentication process conducted by legitimate users may be false positively identified by the existing methods as a password guessing attack irrespectively of the nature and/or characteristic(s) of the incorrect authentication credentials the user provides.

In contrast, analyzing the incorrect authentication credentials as done by the present invention may allow detection of pattern(s) and/or characteristic(s) in the incorrect authentication credentials which are typical to legitimate users and are very non-characteristic for the password guessing attacks. The probability of false positively classifying the legitimate user(s) as a password guessing attack may therefore be significantly reduced while the ability to detect and prevent actual password guessing attacks is not compromised. The risk of the authentication process being part of a password guessing attack may therefore be calculated and adjusted to reflect the probability that the authentication process is conducted by a legitimate user based on such typical pattern(s) and/or characteristic(s) detected in the incorrect authentication credentials. Adjusting the risk to reflect a lower probability of a password guessing attack in case of detection of the typical pattern(s) and/or characteristic(s) may significantly reduce the probability of false positively classifying a legitimate user as the malicious party.

Moreover, by detecting the pattern(s) and/or characteristic(s) in the incorrect authentication credentials as typical to legitimate users, the legitimate user(s) may be granted additional access attempts before denying them access to the secure service. The legitimate user is therefore allowed for an increased number of failed access attempts while maintaining high password guessing attack protection. This may also significantly improve user experience of the legitimate users that may be granted additional access attempts instead of immediately denying them access to the secure service.

Furthermore, the indication messages generated to the user to indicate the typical pattern(s) and/or characteristic(s) of the incorrect authentication credentials may alert the user of the mistakenly provided incorrect authentication credentials and may encourage him to attempt recovering his correct authentication credentials. This may further improve the user experience of the legitimate users.

In addition, based on the statistical analytics generated by analyzing the authentication processes the security policy associated with the secure service may be adjusted to fine tune one or more of the threshold values and/or risk score values according to the typical patterns and/or characteristic(s) identified by analyzing a very large number of authentication processes conducted by a plurality of users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
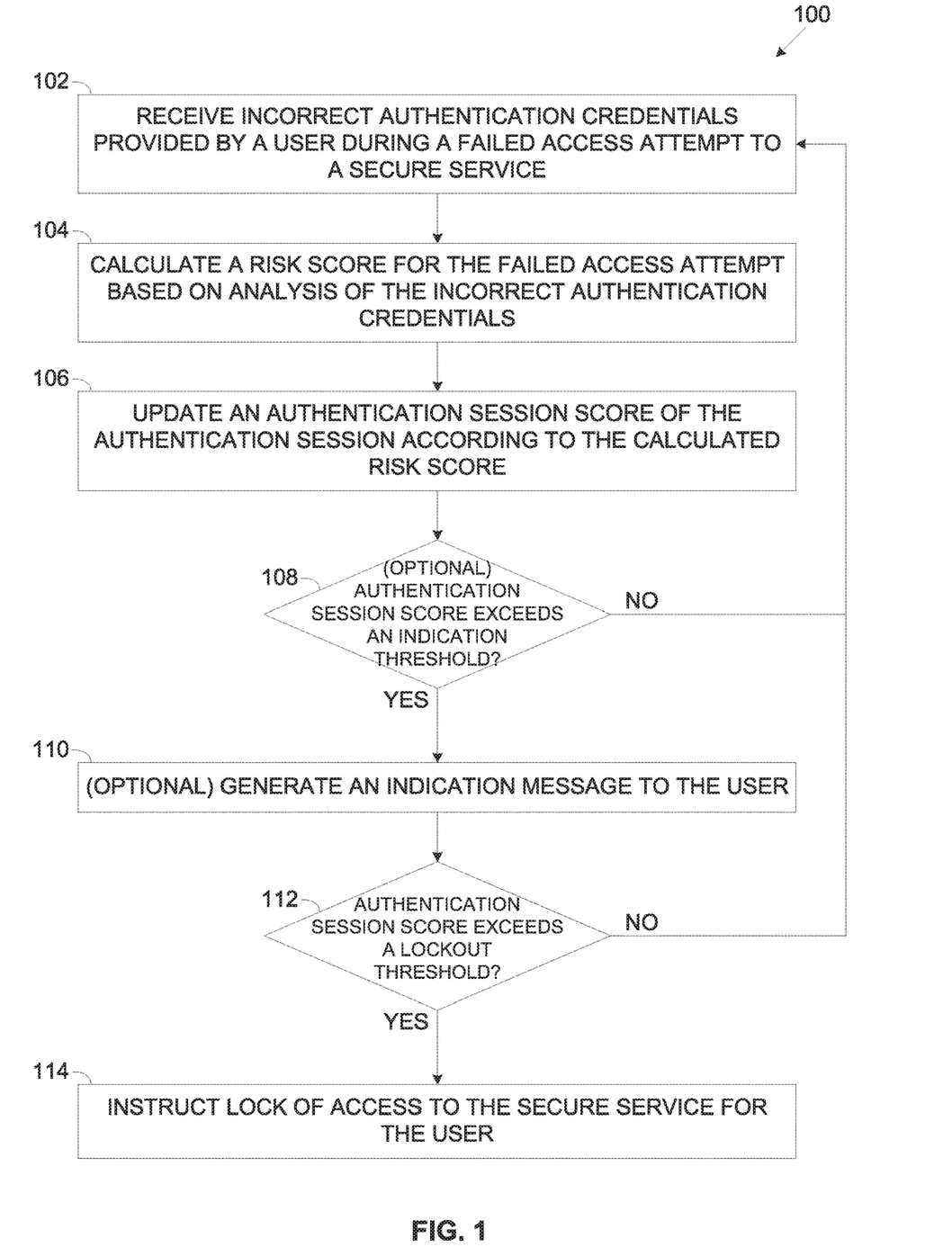
FIG. 1 is a flowchart of an exemplary process of reducing a probability of falsely classifying an authentication process conducted by a legitimate user as a password guessing attack, according to some embodiments of the present invention.

Reference is now made to FIG. 1, which is a flowchart of an exemplary process of reducing a probability of falsely classifying an authentication process conducted by a legitimate user as a password guessing attack, according to some embodiments of the present invention. An exemplary process 100 may be executed for calculating a risk score of an authentication process (session) conducted by a user using a client device to access a secure service. The risk score may be used to evaluate whether failed access attempts in which the user provides incorrect authentication credentials are part of a password guessing attack or whether these failed access attempts are initiated by a legitimate user who mistakenly provides the incorrect authentication credentials. The risk score may be calculated based on one or more patterns and/or characteristics identified in the incorrect authentication credentials which may be indicative of the legitimate user erroneously providing the incorrect authentication credentials.

The incorrect authentication credentials, for example, a password, a code, a key and/or the like provided during multiple failed access attempts of the (same) authentication process may be analyzed to identify one or more patterns and/or characteristics, for example, same incorrect authentication credentials, capitalization differences, textual difference or distance and/or the like.

Based on the analysis of the incorrect authentication credentials, a risk score may be calculated for each of the failed access attempts. Moreover an aggregated authentication process score aggregating the risk score calculated for each of the failed access attempts may be calculated for a current authentication process.

The aggregated authentication process score may be compared to one or more thresholds which may be extracted, for example, from a security policy predefined for the secure service. In case the authentication process score exceeds one or more of the predefined thresholds, one or more actions may be initiated accordingly based on one or more rules predefined in the security policy. Such actions may include, for example, permanently locking access to the secure service for the user, temporary locking access to the secure service for the user for a predefined time period, generating one or more notification message to the user, transmitting one or more notification message to one or more systems and/or persons involved in operating the secure service and/or the like.

Figure 2A:
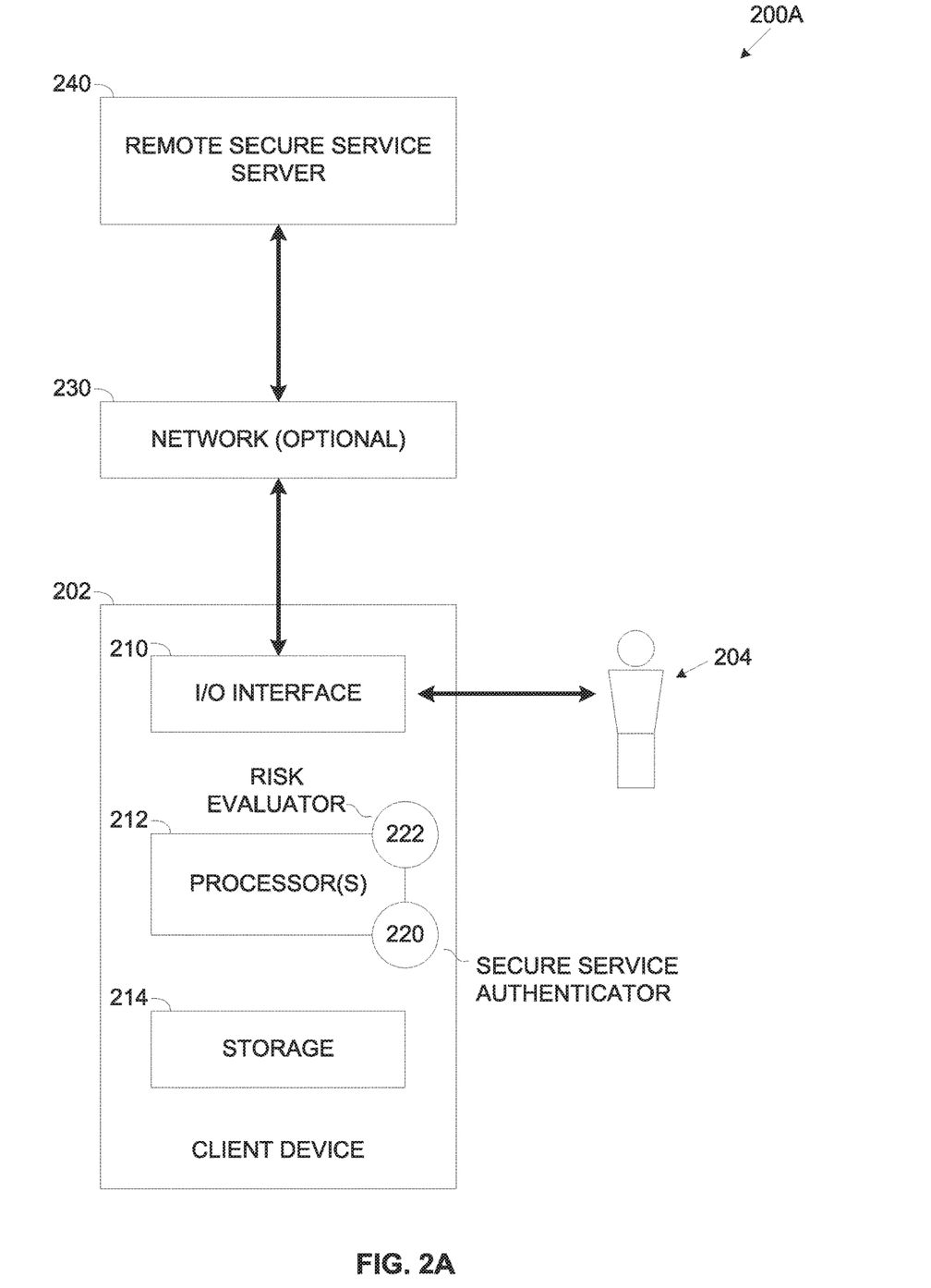
FIG. 2A and FIG. 2B are schematic illustrations of exemplary system embodiments for reducing a probability of falsely classifying an authentication process conducted by a legitimate user as a password guessing attack, according to some embodiments of the present invention.
Figure 2B:
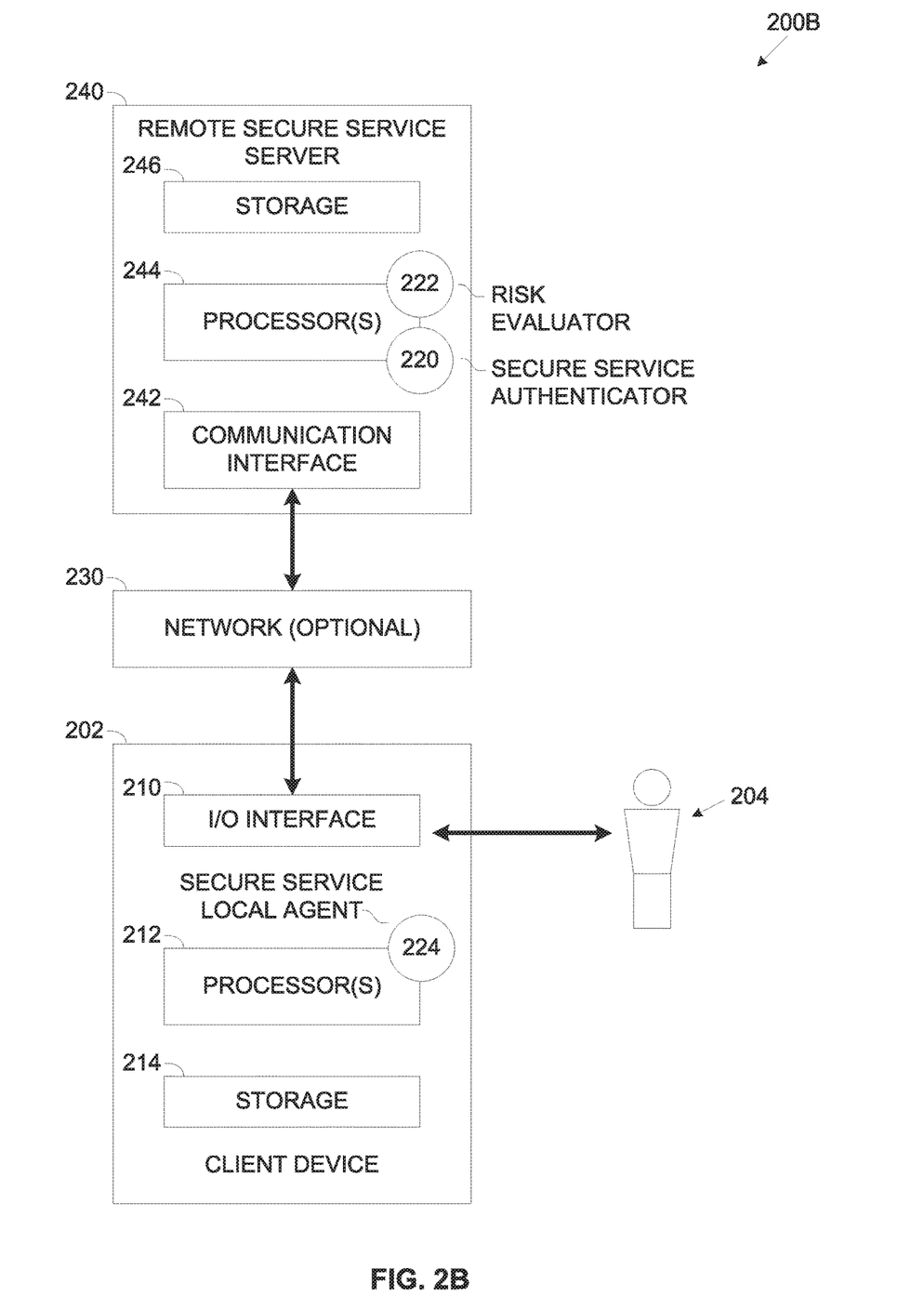

Reference is also made to FIG. 2A and FIG. 2B, which are schematic illustrations of exemplary system embodiments for reducing a probability of falsely classifying an authentication process conducted by a legitimate user as a password guessing attack, according to some embodiments of the present invention. Exemplary systems 200A and 200B include a client device 202 used by a user 204 to access a secure service, a secure device, a secure terminal, a secure system, a secure platform and/or the like collectively designated secure service herein after which the user 204 may access after his successfully authenticated and granted access. The user 204 may be authenticated through an authentication process in which the user 204 provides his authentication credentials, for example, a password, a code, a key and/or the like. In case the authentication credentials are successfully verified the user 204 may be garneted access to the secure service. However in case of failure to verify the authentication credentials of the user 204, the user 204 may be denied of access to the secure service.

The secure service may be a local service provided by the client device 202 and/or a secure service hosted by a remote server 240 accessible to the user 204 using the client device 202. In some embodiments of the present invention, the secure service may be locally controlled and/or managed by the client device 202 as shown in the exemplary system 200A. However, typically the secure service may be controlled and/or managed remotely by the remote server 240 hosting the secure service.

The local secure service may be, for example, the client device 202 itself, for example, a Smartphone, a tablet, a smart watch, a desktop, a laptop, a proprietary client device and/or the like which may be normally locked and requiring user authentication in order to unlock. In another example, the local secure service may be an application, a service and/or the like which may require authentication of the user 204 in order to launch, execute and/or operate. In another example, the local secure service may be physical access (entry) into a secure area, for example, a facility, an office, a plant and/or the like which is restricted for access to approved personnel only. In such the client device 202 may be an access terminal which may be used by the user 204 to provide his authentication credentials, for example, a keypad controlling a door lock, a keypad controlling an alarm system and/or the like.

The remote secure service server 240 hosting the remote secure service may be utilized by, for example, a server, a computing node, a cluster of computing nodes, a cloud service, a cloud platform, a cloud application and/or the like. The user 240 may access the remote secure service server 240 using the client device 202 communicating with the remote secure service server 240 via a network 230 comprising one or more wired and/or wireless networks, for example, a Local Area Network (LAN), a Wide Area Network (WAN), a Metropolitan Area Network (MAN), a cellular network, the internet and/or the like. In order to connect to the remote secure service, the user 204 may use one or more access applications executed by the client device 202, for example, a web browser, a local access agent, a mobile application and/or the like. In another example, the remote secure service server 240 may be accessed by the user 204 using a secure terminal 202, for example, an Automated Teller Machine (ATM), an automated kiosk, a vending and/or the like to provide his authentication credentials.

The client device 202 may comprise an Input/Output (I/O) interface 210 for interacting with the user 204, a processor(s) 212 for executing a process such as the process 100 and a storage 214 for storing data and/or code (program store).

The I/O interface 210 may include one or more user interfaces for interacting with the user 204, for example, a keyboard, a pointing device, a touchscreen, a display, a speaker, an earphone, a microphone and/or the like. Using the I/O interface 212, the user 204 may interact with the client device 202 to provide his authentication credentials, receive one or more notification messages from the secure service and/or the like. Optionally, the I/O interface 210 includes one or more wired and/or wireless communication interfaces for connecting to the network 230, specifically for communicating with the remote secure service server 240, for example, a WAN interface, a LAN interface, a WLAN (e.g. Wi-Fi, etc.) interface, a cellular interface and/or the like.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component, a cache and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212.

As shown in the exemplary system 200A where the secure service is locally controlled by the client device, the processor(s) 212 may execute a secure service authenticator software module 220 for interacting with the user 204 in the authentication process and granting or denying the use 204 access to the secure service according to result of verification of the authentication credentials provided by the user 204. The processor(s) 212 may further execute a risk evaluator software module 222 for executing a process such as the process 100 for evaluating whether failed access attempts detected during the authentication process are part of the password guessing attack (e.g. brute-force attack, dictionary attack, etc.) or whether these failed access attempts are initiated by a legitimate user who mistakenly provides incorrect authentication credentials.

The secure service authenticator 220 and/or the risk authenticator 222 may further utilize one or more hardware elements, for example, a circuit, a component, an Integrated Circuit (IC), an Application Specific Integrated Circuit (ASIC), a Field Programmable Gate Array (FPGA), a Digital Signals Processor (DSP) and/or the like.

As shown in the exemplary system 200B where the secure service is remotely controlled by the remote server 240, the processor(s) 212 may execute a secure service local agent 224, for example, a web browser, a mobile application, an access application and/or the like for communicating with the remote secure service server 240 in order to authenticate the user 204 and grant the user 204 access to the secure service based on the results of the authentication process.

The remote server 240 may include a communication interface 242, a processor(s) 244 such as the processor(s) 212 and a storage 246 such as the storage 214. The communication interface 242 may include one or more wired and/or wireless communication interfaces, for example, a WAN interface, a LAN interface, a WLAN (e.g. Wi-Fi, etc.) interface, a cellular interface and/or the like for connecting to the network 230, specifically for communicating with the client device 202 and the secure service local agent 224, emote secure service server 240. The storage 246 may further include one or more network storage resources, for example, a storage server, a Network Attached Storage (NAS), a network drive, and/or the like accessible via one or more networks through the communication interface 242.

In this deployment, the processor(s) 244 may execute the secure service authenticator 220 for communicating with the secure service local agent 224 which interacts with the user 204 in the authentication process. The service authenticator 220 may further grant or deny the user 204 access to the secure service according to result of the verification of the authentication credentials provided by the user 204. The processor(s) 244 may further execute the risk evaluator software module 222 for executing the process 100. The user 204 may interact with the secure service local agent 224, in particular to provide his authentication credentials which may be transmitted by the secure service local agent 224 to the secure service authenticator 220 executed by the remote secure service server 240.

For security reasons, the secure service authenticator 220 typically does not have access to the actual (correct) authentication credentials of the user 204 but rather has a hashed version of the correct authentication credentials available for the user 204. The hashed authentication credentials may be for example, a hash value of the correct authentication credentials which is created using one or more one-way hash functions such that the correct authentication credentials may not be recovered from the hash value. The hashed authentication credentials may be available to the secure service authenticator 220, for example, retrieved from the storage 214 and/or obtained (e.g. received, retrieved, etc.) from one or more remote network resources, for example, the remote secure service server 240, a remote management server, a management cloud service and/or the like.

The secure service authenticator 220 may therefore verify the authentication credentials provided by the user 204 during an authentication process against the hashed authentication credentials available for the user 204. In order to verify the authentication credentials, the secure service authenticator 220 may hash the authentication credentials provided by the user 204 during the authentication process and compare the result to the hashed authentication credentials available for the user 204. For example, the secure service authenticator 220 may apply to the authentication credentials provided by the user 204 during the authentication process the same hash function(s) originally applied to create the hash value for the correct authentication credentials. The secure service authenticator 220 may compare the hash value generated during the authentication process to the hash value created for the correct authentication credentials and successfully verify the authentication credentials in case of a match or determine the authentication credentials are incorrect in case of no match.

The secure service authenticator 220 may allow the user 204 to initiate several access attempts where in each access attempt the user 204 may provide his authentication credentials. In case the user 204 fails to provide the correct authentication credentials in a predefined number of failed access attempts the secure service authenticator 220 may initiate one or more actions. The actions may include, for example, permanently lock access to the secure service for the user 204, temporarily lock access to the secure service for the user 204 for a predefined time period, initiate one or more massages to the user 204, initiate one or more massages to one or more management systems, applications, services, managers, operators and/or the like associated with managing the secure service and/or the like.

The process 100 may be directed to evaluate whether a plurality of repeated failed access attempts conducted during an authentication process (session) are part of a password guessing attack, for example, a brute-force attack, a dictionary attack and/or the like or whether the user 204 is a legitimate user who mistakenly provided incorrect authentication credentials in multiple access attempts. As such, the risk evaluator 222 may be applied to identify one or more patterns and/or characteristics in the incorrect authentication credentials which may indicate that the user 204 erroneously provides the incorrect authentication credentials. Based on detection of such patterns and/or characteristics, the risk evaluator 222 may calculate a risk score for each failed access attempt and hence for the entire authentication process (session) in order to reduce the probability that an authentication process conducted by the legitimate user is not false positively classified as a password guessing attack. Since the process 100 is directed to detect the patterns and/or characteristics in repeated failed accesses attempts, the process is an iterative process which may be repeated for each failed access attempt conducted by the user 204 during the authentication process.

While the exemplary process 100 as well as the exemplary system 200 are described for a single user 204 this should not be construed as limiting since the process 100 and the system 200 may be applied for a plurality of user such as the user 204 conducting authentication processes in attempt to access the secure service.

As shown at 102, the process 100 starts with the risk evaluator 222 receiving incorrect authentication credentials provided by the user 204 in a current failed access attempt during the authentication process (session) conducted with the user 204 attempting to access the secure service. The authentication credentials may include, for example, a password, a code, a key and/or the like. The risk evaluator 222 may receive the incorrect authentication credentials from the secure service authenticator 220 and/or directly from the I/O interface 212. In particular, the risk evaluator 222 receives the incorrect authentication credentials with an indication that the current access attempt failed, i.e. the authentication credentials provided by the user 204 are incorrect. Such an indication may be generated by the secure service authenticator 220.

As shown at 104, the risk evaluator 222 may calculate a risk score for the current failed access attempt based on analysis of the incorrect authentication credentials provided by the user 204 during the current failed access attempt. Specifically, since the correct authentication credentials of the use 204 are not available to the risk evaluator 222, the risk evaluator 222 may calculate the risk score based on analysis of the incorrect authentication credentials provided during the current failed access attempt compared to the incorrect authentication credentials provided during one or more previous failed access attempts of the current authentication process.

In order to support the analysis for consecutive failed access attempts, the risk evaluator 222 may store the incorrect authentication credentials provided by the user 204 during the current failed access attempt of the current authentication process. As such the risk evaluator 222 may store the incorrect authentication credentials for the duration of the current authentication process. Moreover, to support the analysis in one or more of the future authentication processes, the risk evaluator 222 may also store the hashed version calculated by the secure service authenticator 220 for correct (valid) authentication credentials provided by the user 204 during the current authentication process. The risk evaluator may associate receive the hashed value of the correct authentication credentials with a successful access attempt and hence a successful authentication process based on an indication of success received from the secure service authenticator 220.

As an initial step before analyzing the incorrect authentication credentials provided during the current failed access attempt, the risk evaluator 222 may set the risk score of the current access attempt to a default value. The default value may be extracted, for example, from a security policy defined for the secure service. The risk score of the first failed access attempt may be naturally set to the default value since there are no previous failed access attempts.

Since the primary objective of the authentication process is to authenticate the user 204 as a legitimate user while preventing the password guessing attack, each failed access may be initially evaluated as part of the password guessing attack. The default value initially assigned to the current failed access attempt may therefore be set to a predefined maximum value. As stated before, the predefined maximum value may be extracted, for example, from the security policy predefined for the secure service.

Based on the analysis of the current vs. previous incorrect authentication credentials, the risk evaluator 222 may identify one or more of the patterns and/or characteristics which are not typical to the password guessing attacks and may calculate and/or set a reduced risk score for the current failed access attempt.

For example, in case the risk evaluator 222 identifies that the incorrect authentication credentials provided in the current failed access attempt are identical to the incorrect authentication credentials provided in one or more previous failed access attempts, the risk evaluator 222 may set the risk score of the current failed access attempt to a predefined minimum value, for example, zero. This is since it is not likely that the authentication credentials provided during the password guessing attacks are typically different from each other because the password guessing attacks which are not familiar with the correct authentication credentials of the user 204 attempt to cover a wide range of authentication credentials and hence use different authentication credentials in each access attempt. Therefore failed access attempts in which the exact same authentication credentials are repeatedly provided may be highly indicative that the authentication process is conducted by a legitimate user 204 who mistakenly inserts the incorrect authentication credentials. As such the risk evaluator 222 may set the risk score of the current failed access attempt to the predefined minimum value, specifically zero. The predefined minimum value may be extracted, for example, from the security policy predefined for the secure service.

In another example, the risk evaluator 222 may identify that the incorrect authentication credentials provided in the current failed access attempt are similar to the incorrect authentication credentials provided in one or more previous failed access attempts with the exception of character capitalization. This means that the incorrect authentication credentials provided in the current failed access attempt are similar to the incorrect authentication credentials provided in the previous failed access attempt(s) except that one or more characters of the current incorrect authentication credentials are in capital format compared to corresponding character(s) of the previously provided incorrect authentication credentials. In such case, the risk evaluator 222 may set the risk score of the current failed access attempt to a predefined first value which is lower than the predefined maximum value. Again this is because it is highly unlikely the password guessing attacks in attempt to cover a wide range of authentication credentials will use closely related authentication credentials in several access attempts. The predefined first value may be extracted, for example, from the security policy predefined for the secure service.

In another example, the risk evaluator 222 may identify that the incorrect authentication credentials provided in the current failed access attempt are within a predefined Levenshtein distance from the incorrect authentication credentials provided in one or more previous failed access attempts. This means that a string distance (expressed by the Levenshtein distance) between a string of the incorrect authentication credentials provided in the current failed access attempt and the string of the incorrect authentication credentials provided in the previous failed access attempt(s) is significantly short. In such case, the risk evaluator 222 may set the risk score of the current failed access attempt to a predefined second value which is lower than the predefined maximum value in case the calculated Levenshtein distance between the authentication credentials provided in the current failed access attempt and the previously provided incorrect authentication credentials is within (i.e. does not exceed) a predefined distance threshold. A short Levenshtein distance between incorrect authentication credentials provided in multiple failed access attempts may be highly indicative of a misspelling error which is typical to the legitimate user 204 mistakenly providing the incorrect authentication credentials. In contrast, as described herein before, it is highly unlikely that the password guessing attacks in attempt to cover a wide range of authentication credentials will use closely related authentication credentials (in terms of string distance) in several access attempts and the risk evaluator 222 may therefore reduce the risk score set for the current failed access attempt and set it to the predefined second value. The predefined second value may be extracted, for example, from the security policy predefined for the secure service.

Optionally, in case multiple previous failed access attempts were conducted, the risk evaluator 222 calculates the Levenshtein distance between the incorrect authentication credentials provided in the current failed access attempt and each of the previously provided incorrect authentication credentials. The risk evaluator 222 may then compare a maximum Levenshtein distance which is the largest Levenshtein distance value among the multitude of calculated Levenshtein distances to the predefined distance threshold. In case the maximum Levenshtein distance is within (does not exceed) the predefined distance threshold, the risk evaluator 222 may reduce the risk score set for the risk score of the current failed access attempt to the predefined second value.

In another example, the risk evaluator 222 may identify that the incorrect authentication credentials provided in the current failed access attempt are identical to previously valid historical authentication credentials provided by the user 204 in one or more past authentication processes. In particular, the risk evaluator 222 may compare the hash version calculated for the incorrect authentication credentials provided during the current authentication process to the hash version calculated for one or more previously valid (correct) historical authentication credentials stored during one or more past authentication processes as described herein before (step 102). In such case of a match, the risk evaluator 222 may set the risk score of the current failed access attempt to a predefined third value which is lower than the predefined maximum value. This is since while the user 204 may have changed his authentication credentials and mistakenly attempt to use the no longer but previously valid historical authentication credentials, it may be impossible for the password guessing attacks to obtain such previously valid authentication credentials. Therefore failed access attempts in which the incorrect authentication credentials are identical to the previously valid historical authentication credentials may be highly indicative that the authentication process is conducted by a legitimate user 204 who mistakenly inserts the incorrect authentication credentials. The risk evaluator 222 may therefore reduce the risk score calculated for the current failed access attempt and set it to the predefined third value. The predefined third value may be extracted, for example, from the security policy predefined for the secure service.

As shown at 106, the risk evaluator 222 may update an authentication session score calculated for the current authentication process (session) according to the risk score calculated for the current failed access attempt. For example, the risk evaluator 222 may aggregate, for example, accumulate, sum, join and/or the like the risk score of the current failed access attempt with a value of the authentication session score that is an aggregation of one or more previous failed access attempts of the current authentication process (session). The resulting value of the authentication session score therefore represents a score for all failed access attempts conducted up to this time during the current authentication process.

As shown at 108, which is an optional conditional step, the risk evaluator 222 may compare the updated authentication session score to one or more predefined thresholds, for example, an indication threshold. In case the authentication session score exceeds the predefined indication threshold, the process 100 may branch to 110. In case the authentication session score is within (does not exceed) the predefined indication threshold, the process 100 may branch back to step 102 such that the risk evaluator 222 may receive the incorrect authentication credentials provided by the user 204 in another failed access attempt of the current authentication process. The predefined indication threshold may be extracted, for example, from the security policy predefined for the secure service.

In case optional step 108 is not applied, the process branches to 112.

As shown at 110, the risk evaluator 222 may generate one or more indication messages to the user 204 to notifying the user 204 of one or more aspects of the authentication process. For example, the risk evaluator 222 may notify the user 204 of the number of failed access attempts conducted by the user 204 so far. In another example, risk evaluator 222 may notify the user 204 of the number of remaining access attempts until access to the secure service is locked for the user 204. The risk evaluator 222 may generate the indication message(s) using one or more user interfaces of the I/O interface 212, for example, the display, the speaker and/or the like which may be operated to present the indication message(s) to the user 204.

Moreover, the risk evaluator 222 may apply multiple predefined indication thresholds in step 108 where each of the predefined indication thresholds may be associated in the security policy of the secure service with generation of a certain type of indication message.

As shown at 112, which is a conditional step, the risk evaluator 222 may compare the updated authentication session score to one or more predefined thresholds, for example, a lockout threshold. In case the authentication session score exceeds the predefined lockout threshold, the process 100 may branch to 114. In case the authentication session score is within (does not exceed) the predefined lockout threshold, the process 100 may branch back to step 102 such that the risk evaluator 222 may receive the incorrect authentication credentials provided by the user 204 in another failed access attempt of the current authentication process. The predefined lockout threshold may be extracted, for example, from the security policy predefined for the secure service.

As shown at 114, the risk evaluator 222 may instruct lockout of access to the secure service for the user 204. For example, the risk evaluator 222 may communicate with the secure service authenticator 220 to instruct the secure service authenticator 220 to lock access for the user 204 to the secure service. The lockout instruction initiated by the risk evaluator 222 may indicate one or more types of lockout schemes, for example, a permanent lockout, a temporary lockout for a predefined time period and/or the like. The lockout instructions as well as the predefined time period may be predefined by the security policy predefined for the secure service.

The permanent lookout may force the user 204 to take further action in order to be able to try accessing the secure service again. For example, the user 204 may need to contact one or more of the system(s) and/or person(s) involved in operating the secure service. The temporary lockout may force the user 204 to wait for the predefined time period, for example, 30 seconds, 15 minutes, a day and/or the like before attempting to initiate another access attempt to the secures service.

Moreover, the risk evaluator 222 may apply multiple predefined lockout thresholds in step 112 where each of the lockout thresholds may be associated in the security policy of the secure service with a certain lockout scheme. The risk evaluator 222 may use the multitude of predefined lockout thresholds to apply a gradual lockout. For example, a first lockout threshold may be associated with the temporary lockout scheme while a second predefined lockout threshold which is higher than the first lockout threshold may be associated with the permanent lockout.

Optionally, the risk evaluator 222 generates one or more indication messages to the secure service and/or to one or more of the system(s) and/or person(s) involved in operating the secure service.

Moreover, the risk evaluator 222 may output data relating to the authentication process conducted by the user 204, specifically data relating to the failed access attempts and the incorrect authentication credentials to one or more of the system(s) and/or person(s) involved in operating the secure service. For example, the risk evaluator 222 may transmit the authentication process data to one or more remote network resources via the network 230.

The authentication process data may be used for a plurality of objectives, in particular for generating analytics for a plurality of authentication processes conducted by a plurality of users such as the user 204 in attempt to access the secure service and optionally other secure services. The authentication process data may be analyzed to generate statistic data that may be used to identify one or more patterns and/or trends in the authentication processes, in particular patterns and/or trends relating to the failed access attempts and the incorrect authentication credentials provided during the failed access attempts.

Based on the analytics one or more parameters predefined in the security policy of the secure service may be adjusted, updated and/or modified. For example, one or more of the predefined thresholds may be adjusted in the security policy based on the analytics, for example, one or more of the predefined indication threshold(s), one or more of the predefined lockout threshold(s), the predefined distance threshold and/or the like. In another example, one or more of the predefined values which may be set for the risk score may be adjusted in the security policy based on the analytics, for example, the predefined maximum value, the predefined minimum value, the predefined first value, the predefined second value, the predefined third value and/or the like.

It is expected that during the life of a patent maturing from this application many relevant systems, methods and computer programs will be developed and the scope of the terms hashed authentication credentials and hash functions are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of reducing a probability for falsely classifying a legitimate authentication process conducted by a legitimate user as a password guessing attack, comprising:
    using at least one processor for:
        estimating a password guessing attack risk for an authentication process conducted by a user for accessing a secure service by performing the following for each of a plurality of failed access attempts in which the user provides incorrect authentication credentials:
            calculate a risk score for a respective failed access attempt based on analysis of the incorrect authentication credentials provided during the respective failed access attempt;
            update an authentication session score of the authentication process according to the calculated risk score; and
        initiate at least one action in case the authentication session value updated according to the calculated risk score exceeds at least one threshold value extracted from a security policy predefined for the secure service;
            wherein by default the risk score is set to a predefined maximum value;
            wherein the risk score is set to zero in case the incorrect authentication credentials provided during the respective failed access attempt are identical to the incorrect authentication credentials provided in at least one previous failed access attempt during the current authentication process.

2. The computer implemented method of claim 1, wherein the authentication credentials comprising at least one member of a group consisting of: a code, a password and a key.

3. The computer implemented method of claim 1, wherein the password guessing attack comprising at least one member of a group consisting of: a dictionary attack and a brute-force attack.

4. The computer implemented method of claim 1, wherein the incorrect authentication credentials provided during each failed access attempt are stored for the duration of the authentication process.

5. The computer implemented method of claim 1, wherein the risk score is set to a predefined first value lower than the predefined maximum value in case the incorrect authentication credentials provided during the respective failed access attempt are identical to the incorrect authentication credentials provided in at least one previous failed access attempt during the current authentication process with the exception that the current incorrect authentication credentials are in a different character capitalization compared to the previous incorrect authentication credentials.

6. The computer implemented method of claim 1, wherein the risk score is set to a predefined third value lower than the predefined maximum value in case the incorrect authentication credentials provided during the respective failed access attempt are identical to previously valid historical authentication credentials used by the user in the past for accessing the secure service.

7. The computer implemented method of claim 1, wherein the at least one action is defined by the security policy predefined for the secure service, the at least one action is a member of a group consisting of: instructing a permanent lock of access to the secure service for the user, instructing lock of access to the secure service for the user for a predefined time period and generating at least one notification message to the user.

8. The computer implemented method of claim 7, further comprising adjusting at least one of a predefined maximum value, a first predefined value, a second predefined value and a third predefined value according to the authentication processes analytics, wherein the predefined maximum value, the first predefined value, the second predefined value and the third predefined value are used for calculating the risk value for the incorrect authentication credentials provided during at least one failed access attempt.

9. The computer implemented method of claim 1, further comprising adjusting the at least one threshold value according to authentication processes analytics generated based on analysis of a plurality of authentication processes conducted by a plurality of users attempting to access the secure service.

10. A computer implemented method of reducing a probability for falsely classifying a legitimate authentication process conducted by a legitimate user as a password guessing attack, comprising:

using at least one processor for:
- estimating a password guessing attack risk for an authentication process conducted by a user for accessing a secure service by performing the following for each of a plurality of failed access attempts in which the user provides incorrect authentication credentials:
  - calculate a risk score for a respective failed access attempt based on analysis of the incorrect authentication credentials provided during the respective failed access attempt;
  - update an authentication session score of the authentication process according to the calculated risk score; and
- initiate at least one action in case the authentication session value updated according to the calculated risk score exceeds at least one threshold value extracted from a security policy predefined for the secure service;
- wherein by default the risk score is set to a predefined maximum value;
- wherein the risk score is set to a predefined second value lower than the predefined maximum value in case a Levenshtein distance calculated between the incorrect authentication credentials provided during the respective failed access attempt and the incorrect authentication credentials provided in a previous failed access attempt during the current authentication process is within a predefined distance threshold.

11. The computer implemented method of claim 10, wherein in case a plurality of previous failed access attempts were conducted prior to the respective failed access attempt, the risk score is set to the predefined second value in case a maximum Levenshtein distance is within the predefined distance threshold, the maximum Levenshtein distance is a largest value of the Levenshtein distance calculated between the incorrect authentication credentials provided during the respective failed access attempt and each of the incorrect authentication credentials provided during the plurality of previous failed access attempts.

12. A system for reducing a probability for falsely classifying a legitimate authentication process conducted by a legitimate user as a password guessing attack, comprising:
- a program store storing a code; and
- at least one processor coupled to the program store for executing the stored code, the code comprising:
  - code instructions to estimate a password guessing attack risk for an authentication process conducted by a user for accessing a secure service by performing the following for each of a plurality of failed access attempts in which the user provides incorrect authentication credentials:
    - calculate a risk score for a respective failed access attempt based on analysis of the incorrect authentication credentials provided during the respective failed access attempt;
    - update an authentication session score of the authentication process according to the calculated risk score; and
    - initiate at least one action in case the authentication session value updated according to the calculated risk score exceeds at least one threshold value extracted from a security policy predefined for the secure service;
- wherein by default the risk score is set to a predefined maximum value;
- wherein the risk score is set to zero in case the incorrect authentication credentials provided during the respective failed access attempt are identical to the incorrect authentication credentials provided in at least one previous failed access attempt during the current authentication process.

* * * * *